United States Patent

[11] 3,601,492

[72] Inventor Thomas E. Reichard
 Kirkwood, Mo.
[21] Appl. No. 684,382
[22] Filed Nov. 20, 1967
[45] Patented Aug. 24, 1971
[73] Assignee Monsanto Company
 St. Louis, Mo.

[54] APPARATUS FOR MEASURING FILM THICKNESS
 6 Claims, 16 Drawing Figs.
[52] U.S. Cl. ................................................. 356/108
[51] Int. Cl. ................................................. G01b 9/02
[50] Field of Search ..................................... 356/106,
 106-113, 74

[56] References Cited
 UNITED STATES PATENTS
3,099,579 7/1963 Spitzer et al. ................. 356/108
3,238,839 3/1966 Day, Jr. ......................... 356/108

Primary Examiner—Ronald L. Wibert
Assistant Examiner—Conrad Clark
Attorneys—John D. Upham and William H. Duffey ABSTRACT: Improved means and method for measuring film thickness by rapidly forming and portraying optical interference fringe spectra and interpreting the same directly in terms of film thickness. An internal computer senses movement of a wavelength reference member and causes programmed indices to be displayed along with the interference fringe waveform. A single manual control, with the aid of an improved scanning and display method which balances out time lags, allows the indices to be coordinated with the fringe waveform. An automatic thickness readout device cooperates with the manual control.

INVENTOR
THOMAS E. REICHARD
BY
William H. Duffey
ATTORNEY

INVENTOR
THOMAS E. REICHARD
BY
William H. Duffey
ATTORNEY

APPARATUS FOR MEASURING FILM THICKNESS

MEANS AND METHOD FOR MEASURING FILM THICKNESS

This invention relates to thickness measurements of thin films. More specifically, it relates to the means and method for rapid measurement of the thickness of thin transparent films by optical interference techniques in cooperation with a marker programming system and a direct thickness readout device.

Although the present invention is not confined to the measurement of semiconductor film thickness, it has found particular utility in such applications. It is known that superior semiconductor devices can be produced by combining conventional diffusion techniques with the process of growing thin epitaxial layers of a lightly doped semiconductor material on heavily doped substrates of the same material. In order to properly control the diffusion process, it is necessary to determine the thickness of these epitaxial layers to a high degree of accuracy.

There are a number of commercially accepted methods for measuring the thickness of epitaxial layers, including destructive cross section staining followed by direct measurement under a microscope. Measurement of film thickness by optical interference techniques is superior to the microscope method because it is nondestructive and faster. Epitaxial layers commonly measured by the latter technique include those composed of silicon, germanium and gallium arsenide.

The thickness of a transparent film may be accurately measured by the well known optical interference method wherein a beam of light incident on the film is partially reflected at both the front and rear surfaces of the film. For a given film thickness, the rays reflected respectively from the front and rear surfaces have different phase relationships for various incident wavelengths. If the wavelength is continually varied, the resultant reflected intensity passes through localized maximum and minimum values known as interference fringes. The maximum interference fringe occurs at a wavelength where the phase difference produces maximum constructive interference, i.e., where the waves are in phase. The minimum interference fringe occurs at a wavelength where the phase difference produces maximum destructive interference, i.e., where the waves are out of phase. These maxima and minima occur at wavelengths where the optical path difference between the two reflected rays passes through integral multiples of one-half of the wavelength. Film thickness can then be determined as a function of the wavelengths at which the interference fringe maxima and minima occur.

Thickness measurements of epitaxial films by the optical interference method are conventionally made by obtaining a reflective spectrum, herein described as a fringe spectrum, of the epitaxial film by means of a standard double-beam, optical null, beam-chopped infrared spectrometer fitted with a specular reflection attachment. Useful wavelengths for interference measurements of semiconductor epitaxial films are broadly limited to the infrared spectral range of approximately 1 micron to about 40 microns because of the optical properties of the materials involved. Measurements in the infrared spectral range, especially involving wavelengths greater than 10 microns, are particularly difficult for a number of reasons, principally involving the very small proportion of source energy which is emitted at long wavelengths, the scarcity of transmitting optical materials, and the very sensitive thermal detectors required.

In situations where large numbers of film thickness measurements are to be made on similar specimens such as production inspection, process development, or quality control of semiconductors, a substantial increase in the speed of repetitive measurements is both desirable and profitable. With prior art optical interference methods and instruments for measuring thin films, a single film thickness measurement generally requires a minimum of several minutes. In the infrared region in particular, the minimum time required to obtain a suitable fringe spectrum with a conventional analytical-type spectrometer is on the order of 1 to 2 minutes. Additional operator time is required for interpretation of the fringe spectrum for determination of the film thickness. A 1 minute scan speed over the wavelength range of 10 microns to 35 microns is considered rapid for a conventional infrared double-beam AC spectrometer and is achieved by merely driving the scanning mechanism at a faster rate while sacrificing resolution. A scan speed of 20 seconds over the 10 micron to 35 micron range, although never attained, probably represents the present technological limits on the scan speed of a double-beam AC spectrometer with enough resolution for accurate thickness measurements of epitaxial films by known methods.

Prior to the outstanding achievements of the present invention, attempts to accelerate the film measuring rate of infrared spectrometers have been attended by reduced precision, reduced reliability and reduced reproducibility of results. Through the novel means and method to be herein disclosed, it is now possible, with a single machine operator, to obtain five or more accurate thickness measurements each minute with no sacrifice in reliability or reproducibility. With a data observer assisting the operator, fifteen complete measurements have been recorded in 1 minute, using the illustrated embodiment of the present invention.

It is an object of the present invention, therefore, to provide an instrument and a method for rapid and accurate measurements of film thickness, particularly the thickness of semiconductive epitaxial films.

Another object of the present invention is to provide a method of forming, portraying and interpreting interference fringe spectra with automatic computation of film thickness.

Still another object of the present invention is to provide an improved infrared spectrometer employing computer means adapted to project programmed signals on the displayed infrared reflectance waveform.

Yet another object of the present invention is to provide an improved infrared spectrometer employing computer means cooperating with an automatic thickness readout device.

Still another object of the present invention is to provide the means and method for rapid interpretation of infrared reflectance waveform data.

Still another object of the present invention is to provide a measuring instrument containing an infrared spectrum capable of very rapid bidirectional scanning in spectral regions which include the far infrared region.

Other objects an advantages of the present invention will become apparent from a consideration of the following description and accompanying drawings, and from the appended claims.

Broadly stated, the present invention discloses a means and method of rapidly forming and portraying optical interference fringe spectra and interpreting the same in terms of film thickness.

In a preferred embodiment of the present invention, a light source produces a range of radiation useful for the particular film being studied. This radiation is directed against a semiconductor wafter or other element on which a film thickness measurement is to be obtained. The radiation reflected from the wafer is introduced to a monochromator wherein it is resolved. Thereupon, the intensity of the various resolved wavelengths is ascertained by a suitable infrared detector. A voltage signal from the detector responsive to detected beam intensity is then transmitted to a display instrument such as an oscilloscope, the signal being displayed as a Y-axis deflection. A voltage signal responsive to wavelength is applied to the oscilloscope as an X-axis deflection. The functions relating reflectance waveform data of the wafer film to the optical and mechanical configuration of the spectrometer are coded into an internal computing device so as to trigger vertical marker lines on the oscilloscope trace along with the fringe pattern. The positions of these marker lines are programmed to match fringe peak positions on the displayed spectrum. While the wafer is positioned on the reflectance spot its spectrum is continually scanned and displayed while the set of markers can be independently moved by a single handwheel control. When marker lines are positioned on all peaks of the fringe pattern, the corresponding film thickness is shown on a numerical counter dial.

Figure 1:
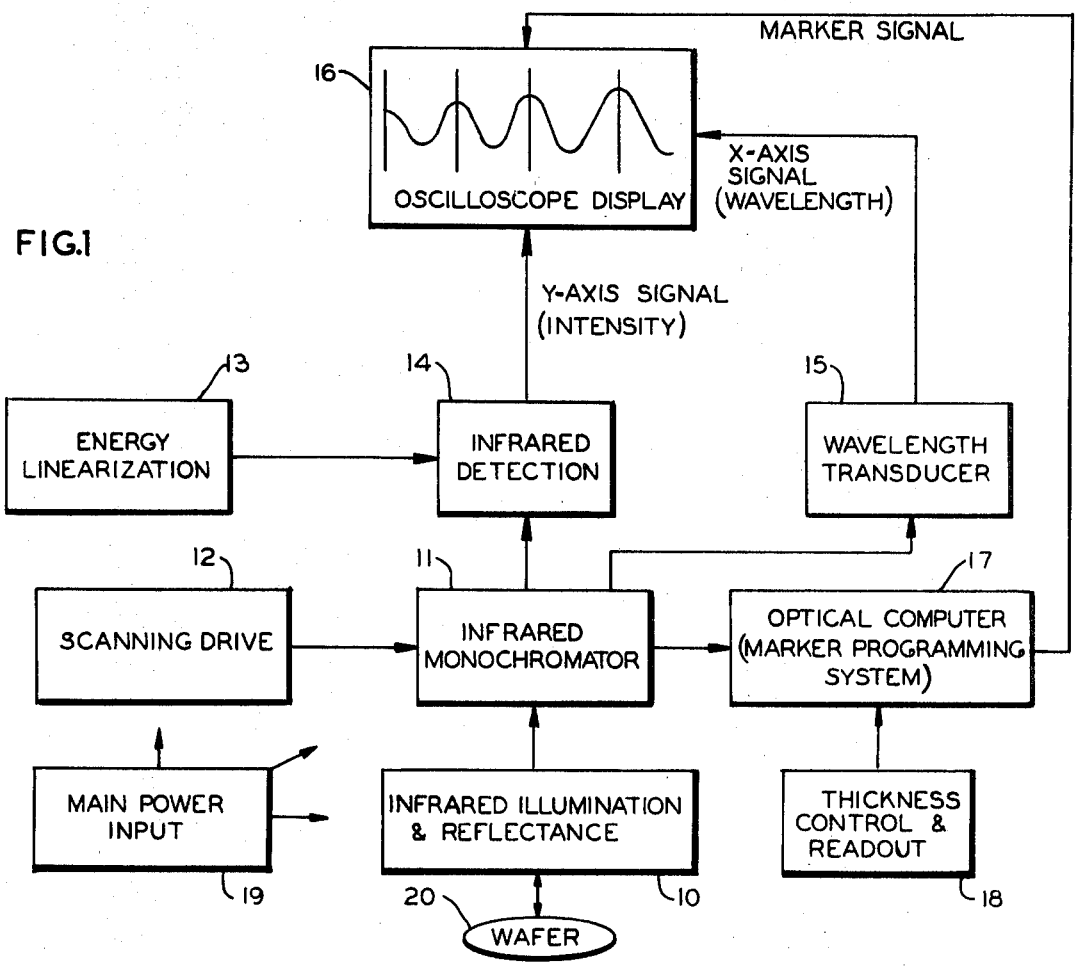
FIG. 1 is a block diagram of the fast-scan infrared spectrometer and computer system of the present invention.

Referring now to FIG. 1 of the drawing, a block diagram of the fast-scan infrared spectrometer-computer system of the present invention is presented. This diagram serves to identify the component systems which cooperate to provide a preferred embodiment of the present invention. The infrared illumination and reflectance system, identified by reference numeral 10, can be considered the starting point for the following detailed description of the preferred embodiment of this invention.

Figure 2:
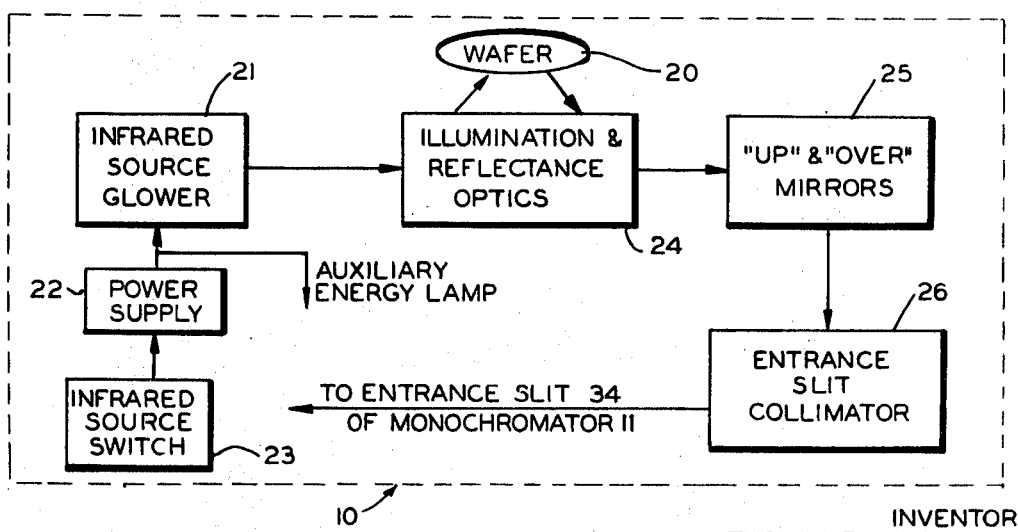
FIG. 2 is a block diagram of the infrared illumination and reflectance system.

FIG. 2 illustrates, in block diagram form, infrared illumination and reflectance system 10 which is similar to prior art systems. Because silicon semiconductor wafers represent one of the most difficult materials from which to derive film thickness measurement by infrared spectrometry, the present description employs silicon wafer 20 as the specimen to be examined. Infrared source glower 21 is preferably a short, straight piece of nichrome wire or ribbon heated to a visible red glow by filtered DC current supply 22, the latter being controlled by switch 23. The illumination and reflectance optics, identified by reference numeral 24, respond to radiation from infrared glower 21 and cooperate with "up" and "over" mirrors 25. Details of the optics represented by reference characters 24 and 25 are shown schematically in FIG. 3. Details of entrance-slit collimator 26 are illustrated schematically in FIG. 4. With further reference to FIG. 2, it will be seen that the optical output of entrance-slit collimator 26 is directed to the entrance slit of monochromator 11, the monochromator system to be described later.

Figure 3:
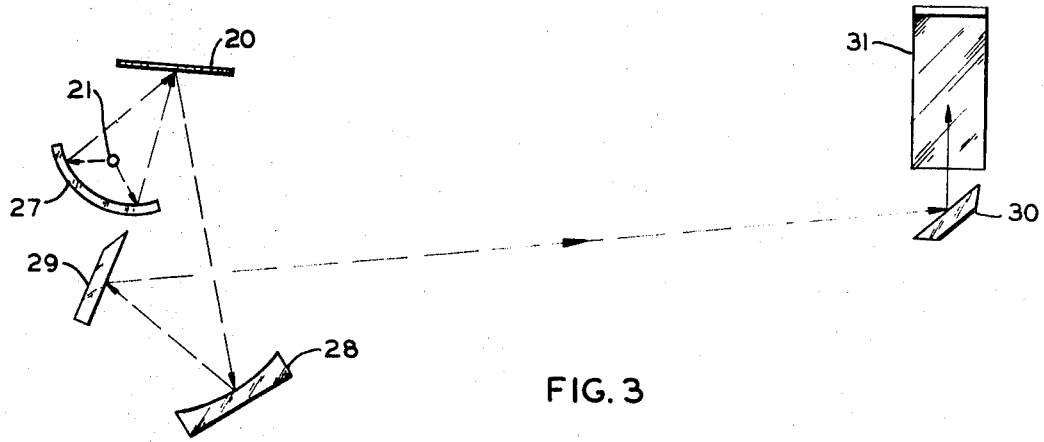
FIG. 3 is a schematic elevation view of the optical portion of the infrared illumination and reflectance system.

Referring now to FIG. 3 of the drawing, the infrared illumination and reflectance optics can be understood by a schematic elevation view. A cylindrical mirror 27 focuses radiant energy from the central portion of nichrome wire 21 into a rectangular image spot approximately 7 millimeters long by 1.5 millimeters wise on wafter 20, at a 24° incidence angle. Concave spherical mirror 28, called the "wafer-image" mirror, receives the diverging infrared radiation reflected from wafer 20. From there the infrared radiation is directed to plane mirror 29 wherein it is reflected to "up-vertical" mirror 30 and thereupon to "over-horizontal" mirror 31. This has the effect of rotating the light through a 90° angle and is done here only for reasons of convenience in layout of parts within the instrument housing.

Figure 4:
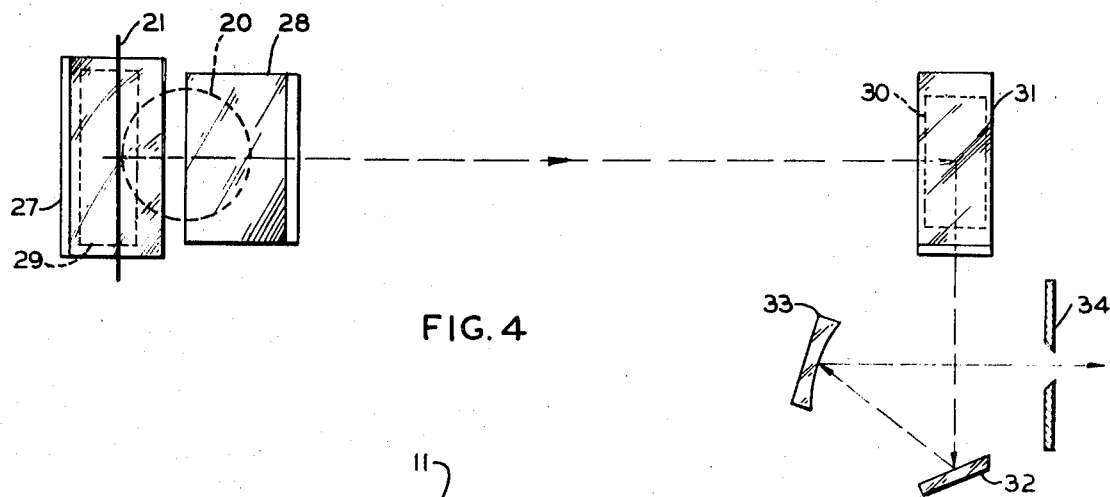
FIG. 4 is a schematic plan view of the same optics shown in FIG. 3 with the addition of the entrance-slit collimator.

Referring now to FIG. 4, a plan view of the optics of FIG. 3 can be seen. FIG. 4 characterizes the illumination and reflectance optics following rotation of the light beam at mirrors 30 and 31. The reflected beam from mirror 31 is directed to entrance-slit diagonal mirror 32 and from there to entrance-slit collimating mirror 33 which directs the beam through entrance slit 34, the latter being a component of infrared monochromator 11.

Figure 5:
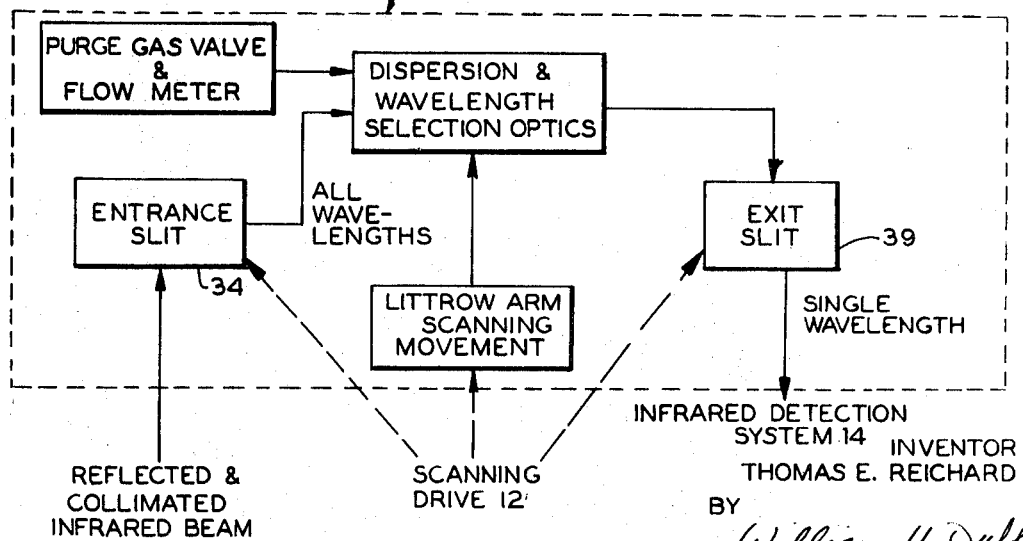
FIG. 5 is a block diagram of the functional elements of the infrared monochromator.

FIG. 5 illustrates, in block diagram form, the functional elements of infrared monochromator 11. Purge gas, preferably clean, dry nitrogen gas, is introduced to monochromator 11 to avoid atmospheric absorption of certain spectral bands in the infrared and to prevent water vapor damage to hygroscopic materials therewithin such as the cesium bromide prism and the cesium iodide detector lens window. It will be observed from FIG. 5 that scanning drive 12, to be described later, cooperates with monochromator 11 to provide movement of three elements, viz, entrance slit 34, exit slit 39, and Littrow arm 40.

Figure 6:
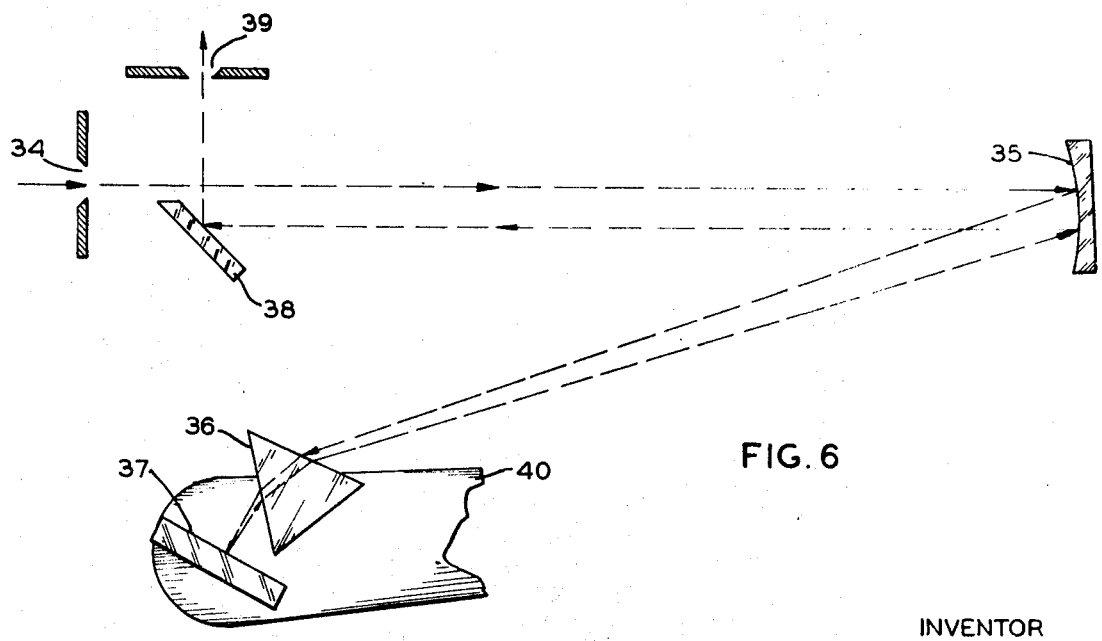
FIG. 6 illustrates schematically the optical ray system of the monochromator.

Reference can now be made to the schematic plan view of FIG. 6 wherein the optical ray system of monochromator 11 is disclosed. The slightly diverging infrared beam, containing all wavelengths reflectance from wafer 20 and its characteristic fringe pattern, i.e., distribution of intensity versus wavelength, passes through entrance slit 34 of monochromator 11. It then reflects from concave main collimating mirror 35 whereupon it converges to a parallel beam and is directed into cesium bromide prism 36, a stationary member. The various wavelengths are dispersed as they initially pass through prism 36, are reflected from plane Littrow mirror 37, and are then further dispersed on the return pass through prism 36. Mirror 37 moves with Littrow arm 40. The dispersed beam is thus directed back toward main collimating mirror 35. Any given angular position of Littrow mirror 37 defines a particular wavelength which will follow the correct path to be reconverged by collimating mirror 35, then reflected back along a path parallel to, but slightly offset from, the incoming beam. Thereupon, it is diverted by slit box diagonal mirror 38 and passed out exit slit 39.

Monochromator 11 is optically identical to prior art designs except that the slit width and slit height programs are approximately doubled at all wavelengths. The doubled slit width program passes four times as much beam power as the conventional design while maintaining good fringe resolution for epitaxial layers up to 2 mils thickness, and usable resolution up to about 3 mils thickness. The increased slit height again doubles the beam power with very little additional losss in resolution. With its more efficient input optics and larger slit image, therefore, the fast scan spectrometer of the present invention passes about 15 times as much infrared beam power as prior art instruments employing the same prism size and angular aperture.

With further reference to FIG. 6, the wavelength selected and passed by monochromator 11 depends solely on the angular position of Littrow mirror 37. Thus, the desired spectrum is scanned merely by pivoting the Littrow assembly about its vertical axis, i.e., by moving Littrow arm 40. Entrance slit 34 and exit slit 39 are each programmed in movement, tracking precisely with wavelength scanning to provide optimum beam power and resolution conditions at each point throughout each spectrum. This result is brought about by scanning drive system 12.

Figure 7:
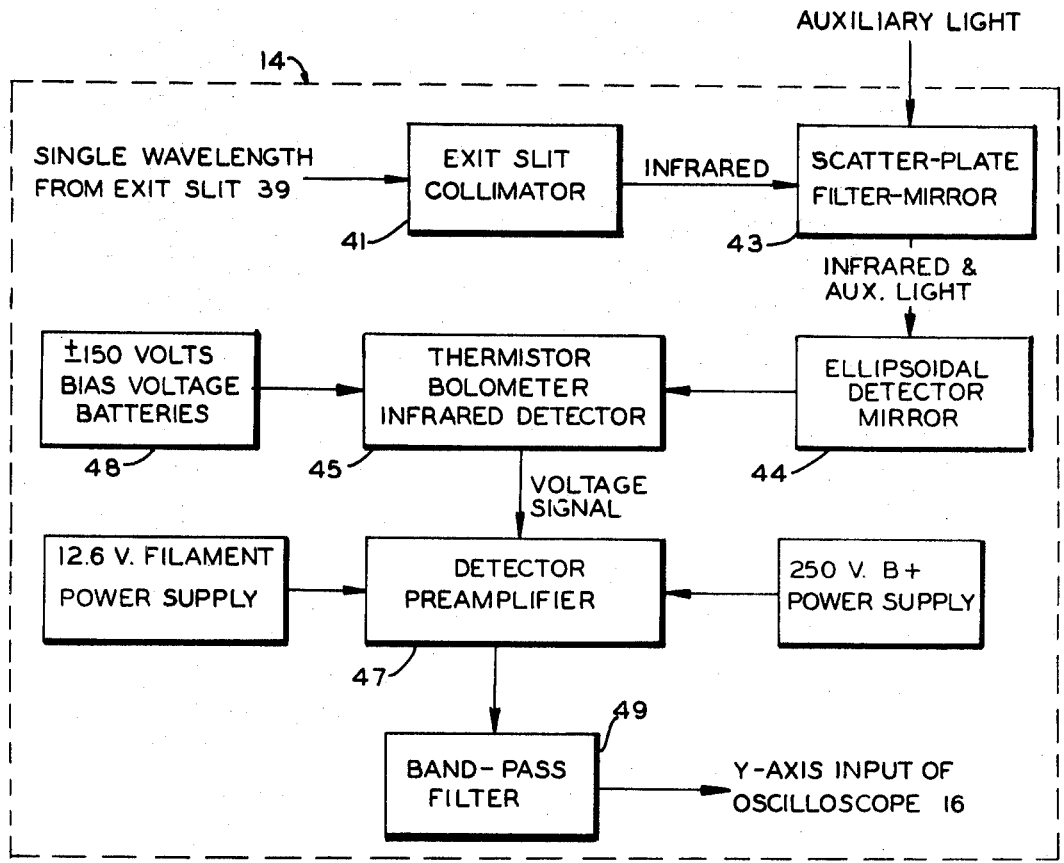
FIG. 7 is a block diagram of the infrared detection system.
Figure 8:
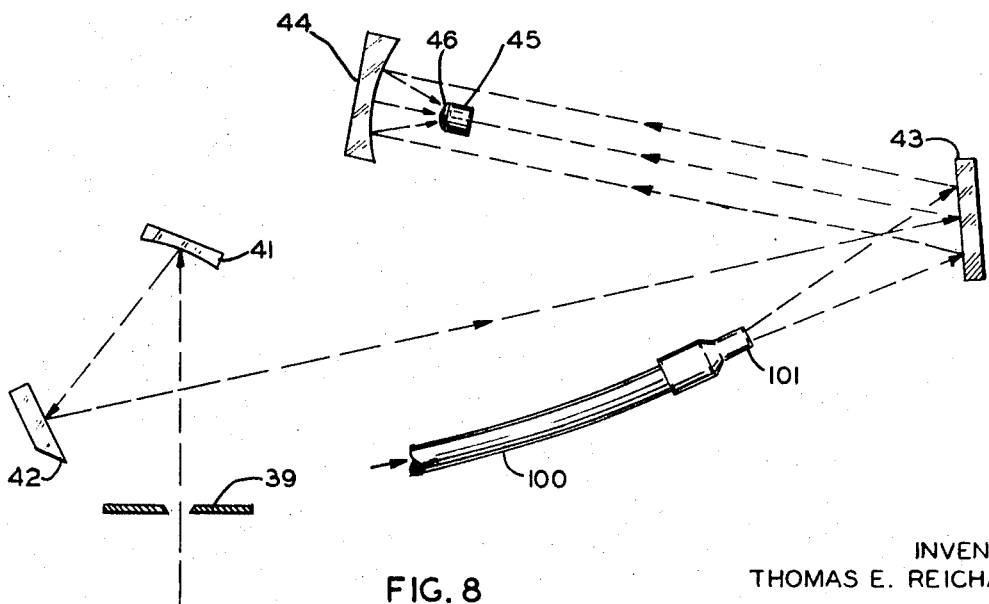
FIG. 8 is a schematic plan view of the infrared detector optics.

Reference is now made to the infrared detection system identified by reference numeral 14 in the composite diagram of FIG. 1. A block diagram of this system is seen in FIG. 7 and a schematic plan view of the detector optics is seen in FIG. 8. With reference now to FIG. 8, the monochromatic infrared beam selected by monochromator 11 emerges from exit slit 39 and is slightly converged by exit slit collimating mirror 41.

Thereupon, it is reflected from exit slit diagonal mirror 42 onto scatterplate filter mirror 43. Filter mirror 43 has a slightly roughened surface which makes it a poor reflector for visible and near infrared wavelengths, while still serving as a satisfactory mirror for the longer wavelengths. Thus, it preferentially scatters and eliminates most of the undesired stray light while passing most of the useful 11 to 35 micron radiation.

With further reference to FIG. 8, the infrared beam passes from filter mirror 43 to ellipsoidal detector mirror 44, the latter having a wide aperture and short focal length. Thereby, the beam is focused onto detector 45. The exit slit image is reduced approximately 15 times at detector 45. The cesium iodide lens window 46 of detector 45 reduces this image another two times to just cover the thermistor bolometer element which is located in the center of detector assembly 45.

Because of the very small amount of radiant power available at far infrared wavelengths, the infrared detection and readout system shown in FIG. 7 and FIG. 8 comprises a critical part of the embodiment of the present invention. Even with the substantial increase in infrared beam power afforded by the optical design herein, the maximum peak-to-valley fringe height of even the strongest fringe pattern seldom exceeds 0.5 microwatts.

Under normal conditions, the instrument of the present invention can reliably detect, display and measure interference fringes whose maximum peak-to-valley height corresponds to 1 percent of total beam energy as measured on a commercial double-beam spectrometer, normalized to 100 percent full scale without reference beam attenuation. In this case the maximum peak-to-valley beam power change is about 0.03 microwatts. This produces a temperature change of about $0.000005°$ C. in the active thermistor flake of detector 45, which changes its resistance at the rate of 4 percent per $°$ C. so the corresponding electrical resistance change is 0.2 parts per million. When biased at its maximum safe level of 160 volts, the active flake along would then produce a voltage signal of 32 microvolts. In order to minimize the effects of ambient temperature drifts, however, the active thermistor is placed in a bridge circuit with an identical compensating thermistor which is shielded from the infrared beam. The bridge output is then one-half that of the active element, i.e., 16 microvolts. The electrical resistance of each thermistor element is 2.2 megohms, and the net bridge impedance is 1.1 megohms.

In order to achieve the fast scanning capability which characterizes the instrument of this invention, the signal from detector 45 must be read out directly without the benefit of time-averaging, beam-chopping, phase-locked amplification, and other techniques which are commonly used to extract weak signals from random noise effects. Furthermore, the nature of the spectrum scan function, display, and interpretation limits the degree of electronic filtration which can be applied without excessive phase lag. The active frequency bandwidth, therefore, must be left relatively wide, but this in turn places extraordinary low-noise requirements on preamplifier 47 and thermistor bias voltage supply 48, diagrammatically shown in FIG. 7 of the drawing.

Preamplifier 47 is a vacuum tube unit which introduces only about 2 microvolts equivalent input noise in the passed bandwidth. In a preferred embodiment of the present invention, preamplifier 47 is mounted within the enclosure of monochromator 11 and is separated from detector 45 by a heat sink wall and a radiation shield. Electrical connections should be short and rigid to minimize microphonic voltages induced by physical vibration. The output signal of preamplifier 47 is amplified 1,500 times and has low impedance, thus reducing its susceptibility to stray noise effects. The output signal is directed through band-pass filter 49 to the Y-axis input of oscilloscope 16, thus indicating the intensity of the fringe pattern being analyzed.

Referring again to FIG. 7, the bias voltage to detector 45 is preferably provided by a battery pack 48 made up of zinc-carbon dry cells. The thermistor bridge draws 90 microamps of current.

The next major component of the present invention to be described is scanning drive system 12. Scanning drive system 12 can best be understood by reference to the plan view of FIG. 9 which disclosed, inter alia, the Littrow arm and slit drive mechanisms. Although scanning drive mechanisms for infrared spectrometers are familiar to the art, the scanning drive mechanism employed in the present invention is characterized by two unusual features. That is, provisions are made for manual control of spectrum scanning speed and the spectrum is scanned in two directions instead of the conventional single direction method. Since the number of fringe cycles per spectrum is directly proportional to film thickness, the spectrum scanning speed is varied herein for different epitaxial layer thicknesses so that the time-frequency relationship of interference fringes remains within a relatively narrow band, e.g., 10Hz. to 30Hz. This band is optimum for infrared detector response and signal-noise ratio in this embodiment.

Figure 9:
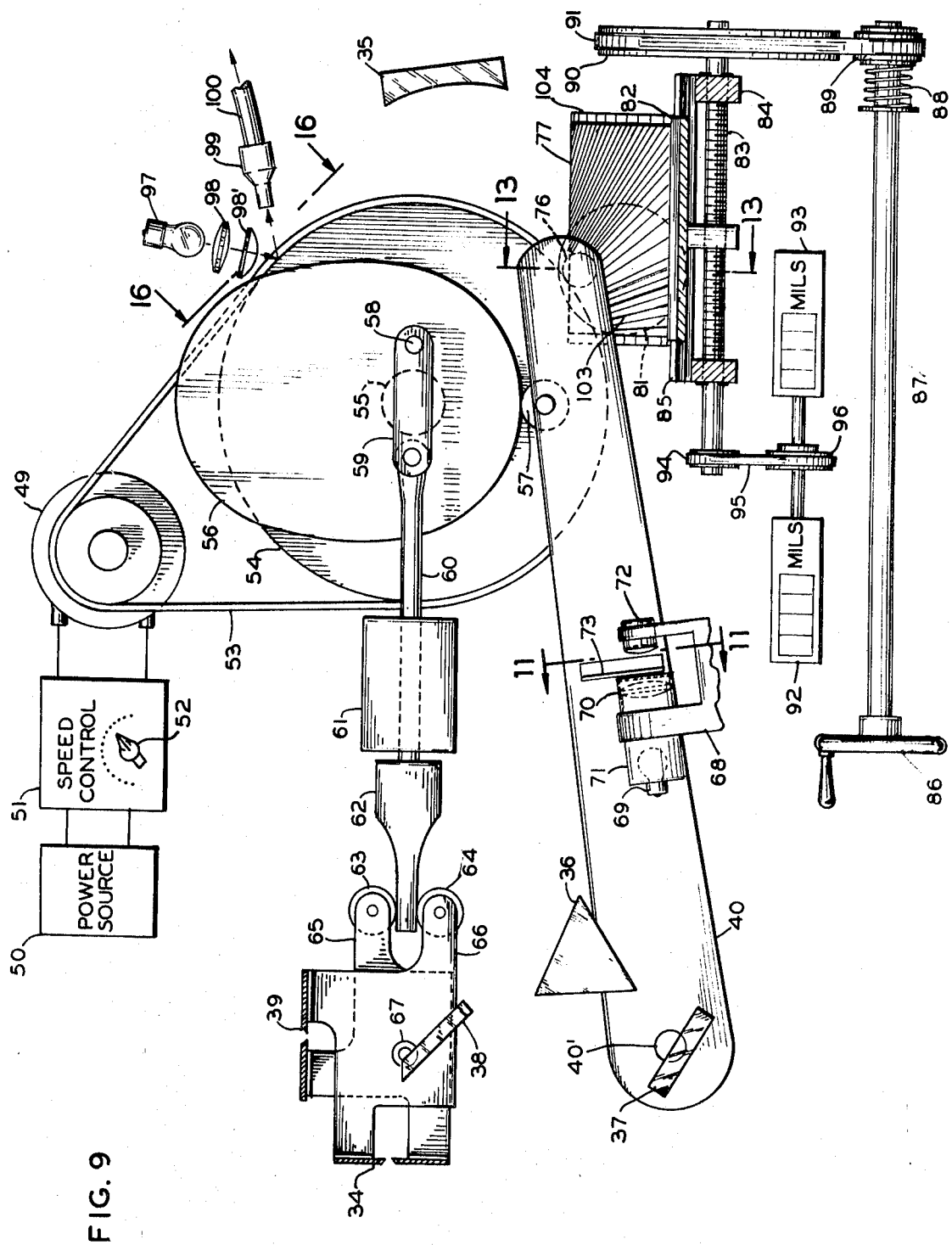
FIG. 9 is a plan view of the principal mechanisms within the instrument of the present invention.

Referring now to FIG. 9, motive power for the scanning drive mechanism is afforded by a small DC motor 49 which has a feedback generator disposed on a common drive shaft and a separately mounted power supply 50. Speed control unit 51 has a speed control potentiometer 52 which is calibrated directly in mils thickness. An appropriate maximum speed is 10 scans per second for 0.10 mils thickness and minimum is about one-third scan per second for 3 mils thickness.

With further reference to FIG. 9, motor 49, through drive belt 53, drives flywheel 54, the latter being concentrically mounted on main camshaft 55. On the opposite end of camshaft 55 is affixed wavelength cam 56, an oval shaped, eccentrically mounted flat plate which drives Littrow arm 40 about pivot pin 40' via cam rider wheel 57, the latter being a ball bearing with nylon tread, affixed to Littrow arm 40. Arm 40 is preferably spring loaded against cam 56 and also downward against a flat guide plate. Cam 56 is contoured such that, in each 360° of continuous rotation of camshaft 55, Littrow arm 40 accelerates from rest at the 0° minimum radius point on the cam to the 11 micron wavelength position and velocity at 8°. Thereupon, arm 40 scans through the spectrum in such a way that the wave number, i.e. the reciprocal of the wavelength, is approximately linear with time. The time frequency of interference fringes is thereby kept approximately constant throughout the wavelength range. As cam 56 rotates with uniform angular velocity, arm 40 therefore moves relatively slowly through the short wavelength part of the spectrum, but outward velocity and acceleration of arm 40 increase continually, with a pronounced acceleration toward the long wavelength end. Arm 40 reaches the 35 micron position with maximum velocity at 140° of cam rotation, then decelerates uniformly to a stop at the 180° maximum throw position.

The wavelength scanning process of Littrow arm 40 is exactly repeated in reverse during the second half-revolution of wavelength cam 56. Return spring pressure accelerates arm 40 inward against the "downhill" surface of cam 56 to attain maximum velocity at the 35 micron wavelength position at 220°, decelerates as it scans, again with wave number approximately linear in time, to the 11 micron position at 352°, then comes to rest again at 360°.

The reciprocating scanning technique described above contributes substantially to the rapid measuring achievement of the present invention by conserving time and minimizing inertia forces, thus reducing mechanical wear of parts. Furthermore, this technique tends to balance out the phase lag, as is discussed in more detail hereinafter. Virtually any wavelength function could be incorporated in the cam geometry although a function having wave number approximately linear in time is preferred in order to keep the fringe frequency within a narrow band.

Referring again to FIG. 9, the drive mechanism for entrance slit 34 and exit slit 39 can be understood. An eccentric crankpin 58 rotating with camshaft 55 imparts a sinusoidal driving motion to connecting link 59 which in turn causes pushrod 60 to reciprocate within stationary guide bushing 61. To the end of pushrod 60 is affixed wedge-shaped spreader cam 62. The contoured surfaces of spreader cam 62 engage rolling followers 63 and 64 which are integral with slit box members 65 and 66, respectively. The fore and aft motion of spreader cam 62 causes slit box members 65 and 66 to rotate about pivot pin 67, thus creating the required programmed slit movement in synchronization with the scanning movement of Littrow arm 40. The entrance slit jaws are indicated by reference numeral 34 and exit slit jaws by numeral 39.

The motion of slit jaws 34 and 39 of FIG. 9 is similar to that of Littrow arm 40 in that the jaws move slowly through the short wavelength portion of the spectrum, then accelerate very rapidly at the long wavelength end. Flywheel 54 serves to minimize variations in speed caused by the spring-loaded cam followers, particularly at slow scan rates.

The next system to be described is the wavelength transducer system identified by reference numeral 15 in the composite diagram of FIG. 1. In order to present the fringe spectrum from wafer 20 on oscilloscope 16 in the conventional manner, i.e., with the horizontal axis linear in wavelength, a programmed transducer is required. The mechanical movement of Littrow arm 40 is a smooth but nonlinear function of wavelength, being derived from the refractive index function of prism 36. This movement is converted to a voltage signal which is linear in wavelength by a small optical system mounted just above Littrow arm 40.

Figure 11:
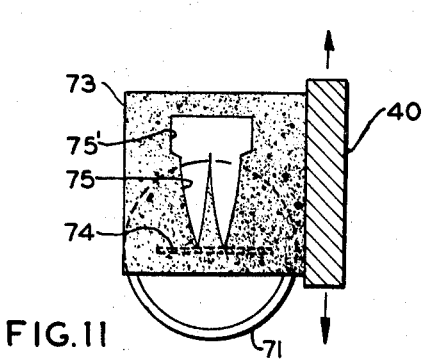
FIG. 11 is a vertical sectional view taken along line 11—11 of FIG. 9.
Figure 10:
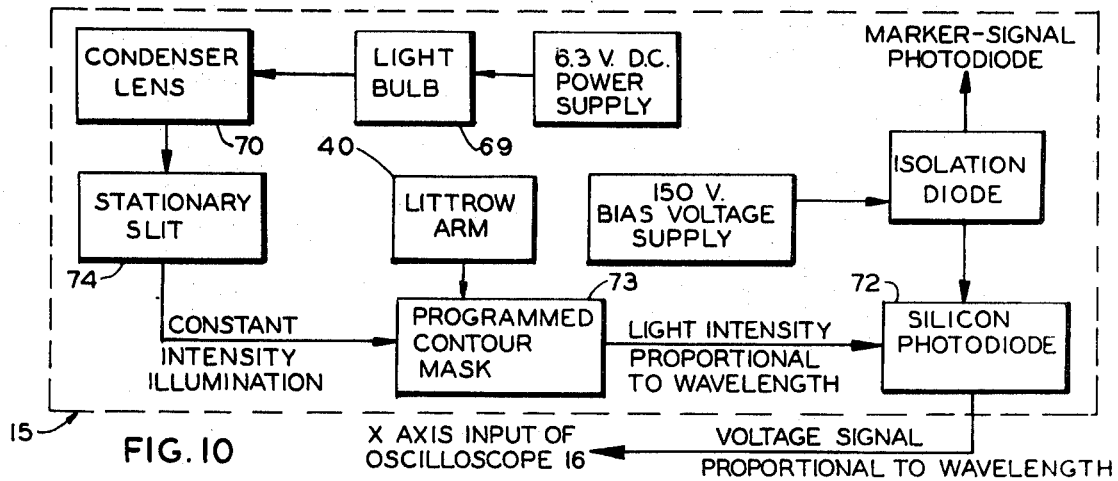
FIG. 10 is a block diagram of the wavelength transducer system.

Wavelength transducer system 15 is shown in block diagram form in FIG. 10 and the physical parts can be seen in FIG. 9 and FIG. 11. Referring now to FIG. 9, the small optical system for the wavelength transducer is positioned just above the center of Littrow arm 40, the stationary parts being held by fixture 68. Constant intensity lamp 69 and condenser lens 70 are disposed within closed cylindrical housing member 71, the latter having a small vertical slit in the end adjacent lens 70. Lamp 69 thus focuses light through the slit onto photodiode 72, a light sensing detector. A small glass photographic plate 73, called the contour photomask, is affixed to Littrow arm 40 such that it passes immediately in front of the slit in housing 71, between the slit and photodiode 72.

For a better understanding of the wavelength transducer optics, reference can be made to FIG. 11, a vertical sectional view taken along line 11—11 of FIG. 9. The slit in housing 71 is identified by reference numeral 74. A tapered wedge-shaped "optical comb" opening 75 in photomask 73 limits the length of slit 74 through which light can pass. Taper 75 of the mask image is contoured so that, as Littrow arm 40 moves to scan the spectrum, the light intensity passing to photodiode 72 is linearly proportional to the infrared wavelength being scanned. The output voltage signal of photodiode 72, therefore, is approximately linear in infrared wavelength and is used directly to drive the X-axis of oscilloscope 16. At a point just past the 35 micron end of the spectrum, identified by reference numeral 75', contour photomask 73 completely opens, producing an abrupt large signal which shoots the oscilloscope beam far off-screen during the overshoot and turnaround part of the scan cycle then returns it on-screen just as suddenly for the 35 micron to 11 micron reverse scan.

The next system to be described herein is the marker programming system, identified by reference numeral 17 in the composite block diagram of FIG. 1. This system, which comprises one of the outstanding features of the present invention, supplies movable index marks to oscilloscope 16 which can be superimposed on the displayed fringe spectrum by actuation of a manual control. For a given film thickness of wafer 20, a single, unique position of the control will cause each of the index marks to be properly positioned on the center of the respective fringe peaks and valleys, whereupon the actual film thickness is established by the position of the control and can be directly read or recorded by any suitably calibrated readout system.

Figure 12:
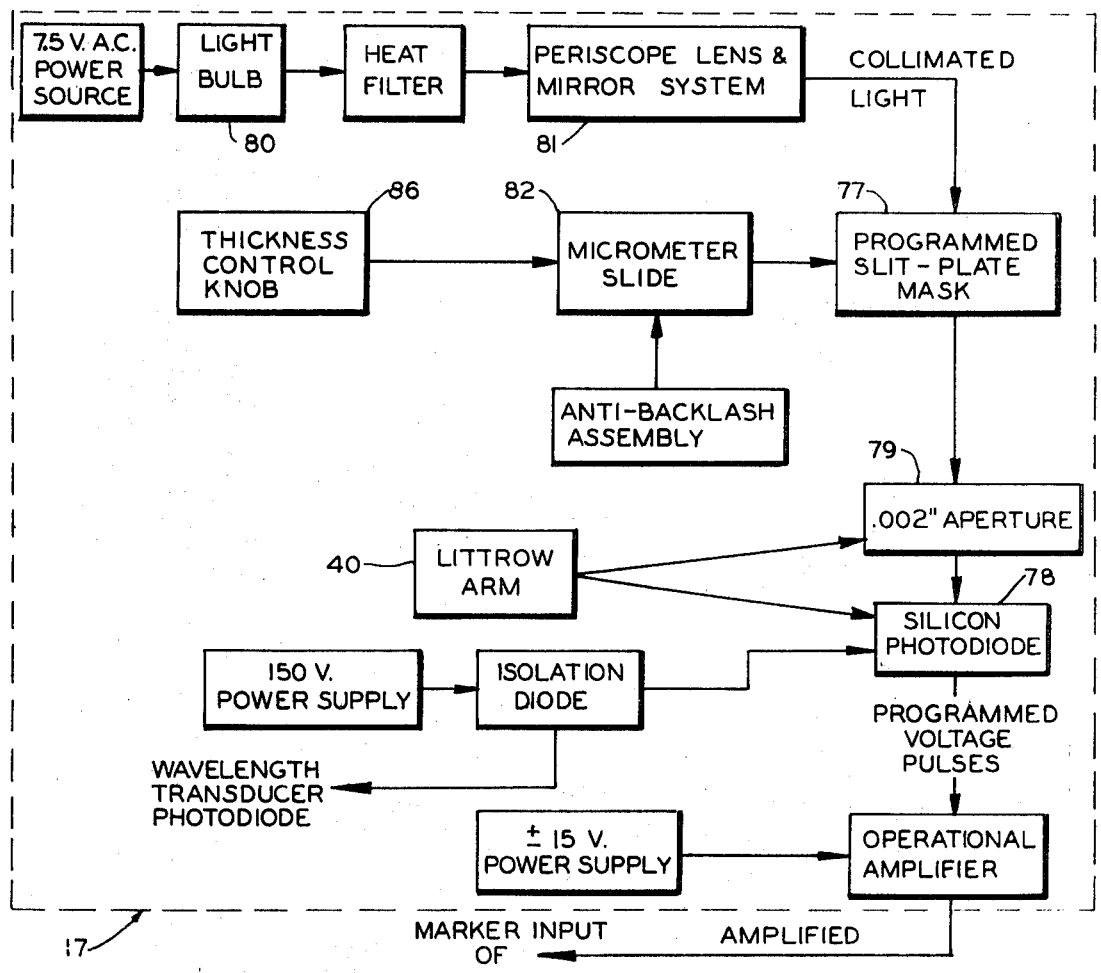
FIG. 12 is a block diagram of the marker programming system.

In the preferred embodiment of the instant disclosure, the marker programming function is achieved by an optical computer system which supplies programmed signals to oscilloscope 16 to trigger vertical marker lines at the desired fringe peak positions. A block diagram of optical computer system 17 is presented in FIG. 12, and the mechanical parts can be seen in FIG. 9 and FIG. 13.

With reference now to FIG. 9, near the free end of Littrow arm 40 on the underside, approximately 11 inches from pivot pin 40', a photodiode is encased within an essentially closed housing 76. As arm 40 swings through its scan from 11 microns, to 35 microns, the diode travels about 1.2 inches in an 11-inch radius arc. Immediately below diode housing 76 is a glass photographic mask plate 77, which is opaque black except for a series of narrow transparent lines. Photomask plate 77 is mounted on a precision micrometer slide movement, the latter to be described later.

Figure 13:
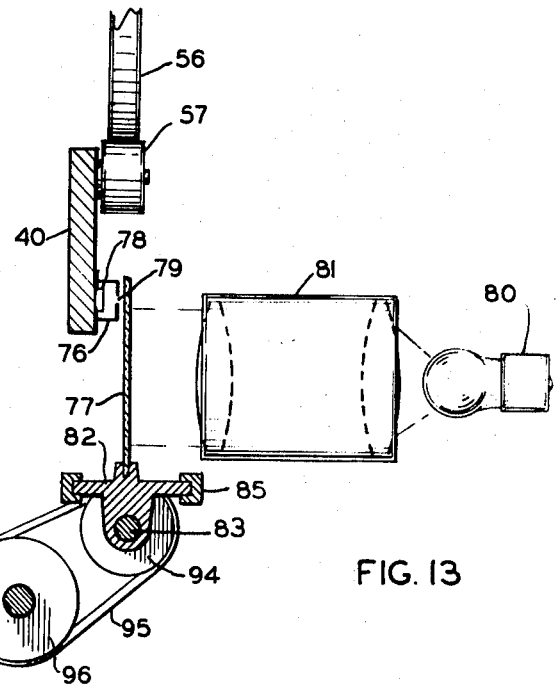
FIG. 13 is a vertical sectional view taken along line 13—13 of FIG. 9.

A better understanding of the marker-programming system optics can be obtained through reference to FIG. 13, a vertical sectional view taken along lines 13—13 of FIG. 9. Photodiode 78, which is affixed to Littrow arm 40, is fully shrouded by housing 76 except for a 0.002 inch diameter aperture 79 in housing 76. Photomask plate 77 is illuminated on the face opposite photodiode 78 by a lamp assembly mounted outside the spectrometer unit. Lamp 80 introduces light into periscope assembly 81 which focuses it into a uniform parallel beam covering the scanning path of photodiode 78. A heat filter is provided between lamp 80 and periscope assembly 81.

With reference now to both FIG. 9 and FIG. 13, whenever aperture 79 passes one of the transparent lines on photomask plate 77, photodiode 78 detects a momentary light signal and produces a small voltage pulse which is then amplified by the operational amplifier and passed to the marker input of the oscilloscope, thus triggering a vertical marker line on the display.

The lines on photomask plate 77 are so arranged that, for any given plate position, they correspond to fringe peak wavelengths for a given thickness of wafer film. Furthermore, they are so arranged that linear movement of mask plate 77 through the micrometer continually changes the programmed pulses of photodiode 78 to match other film thicknesses. In the illustrated embodiment, each inch of movement of plate 77 corresponds to one mil of wafer film thickness in a direct linear relationship. In order to provide additional reference points for measurement of thin films, which form only a few fringe peaks, closely spaced double line markers 103 are provided at positions corresponding to fringe valley positions for the first several half-orders. Calibration lines 104 are provided at the ends of plate 77 to produce marker lines on the display at every whole micron wavelength position when plate 77 is set at the extremities of its movement range.

Figure 14:
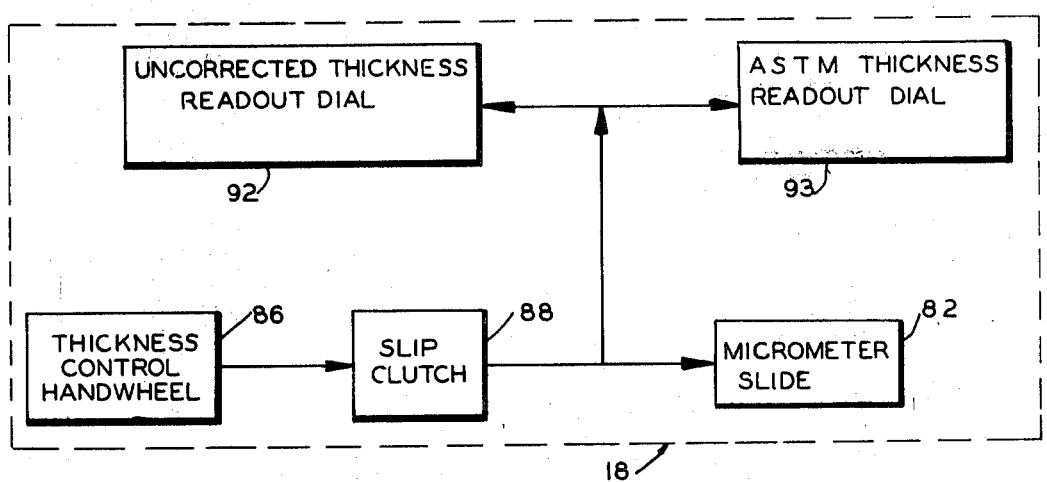
FIG. 14 is a block diagram of the film thickness readout system.

The next system of the preferred embodiment to be described pertains to film thickness readout, identified in the composite diagram of FIG. 1 by reference numeral 18. The block diagram of FIG. 14 broadly describes this system wherein the thickness reading in mils can be characterized in two ways, viz, uncorrected thickness and ASTM thickness. For visualization of the mechanical components, reference can now be made to FIG. 9 and FIG. 13. Photomask plate 77 of the marker programming system is affixed to traverse member 82, the latter being adapted to engage micrometer leadscrew 83 at three locations, shown typically by reference numeral 84. Horizontal stability of traverse member 82 is afforded by guide members 85.

Since the line contours on photomask plate 77 make the film thickness setting a direct and linear function of micrometer slide movement, the control and readout system consists only of direct mechanical linkages. One inch of micrometer movement equals 1 mil of film thickness. Leadscrew 83 has a pitch of 20 threads per inch, thus each full turn thereof corresponds to 0.050 mils film thickness. Referring again to FIG. 9, micrometer movement is initiated by manual rotation of handwheel 86 which drives shaft 87 through slip clutch 88, the latter preventing overtorque at the limits of micrometer travel. Affixed to the end of shaft 87 is pulley 89 which drives large pulley 90 by way of belt 91. A reduction ratio is thus achieved at leadscrew 83, to which 90 is affixed.

With further reference to FIG. 9, the wafer film thickness is displayed in mils on counter dials 92 and 93 which are driven from leadscrew 83 through pulley 94, belt 95 and pulley 96, respectively. The belt and pulley systems cooperating with the micrometer must allow no slippage and an antibacklash device in the movement promotes accuracy.

The next system of the preferred embodiment of this invention is the auxiliary energy linearization system, identified in the composite block diagram of FIG. 1 by reference numeral 13. Variations in emissivity, reflectivity and absorption of various optical components in this measuring instrument may cause systematic short range fluctuations in infrared beam energy versus wavelength throughout the spectrum. Because of resolution and mechanical inertia considerations, these cannot be fully smoothed out by the programmed slit movement. The auxiliary linearization system introduces programmed amounts of compensating radiant energy into bolometer detector 45 to smooth out these remaining fluctuations. This system employs a moving optical mask device which can make abrupt energy changes without inertial limitations.

Figure 15:
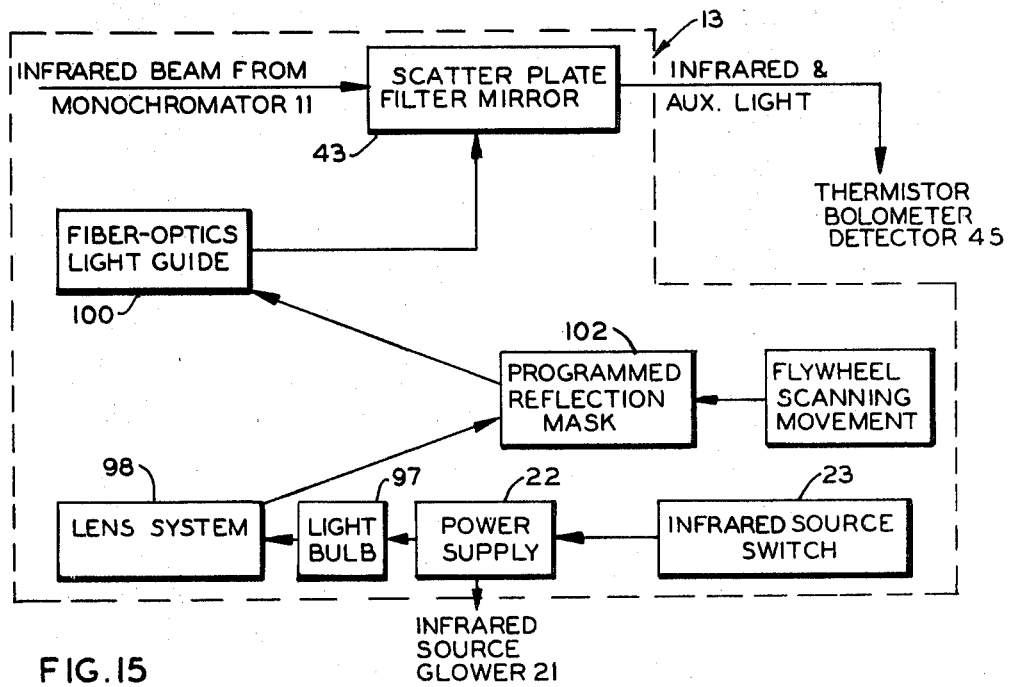
FIG. 15 is a block diagram of the auxiliary energy linearization system.

The block diagram of FIG. 15 describes the auxiliary energy linearization system and the optical parts can be seen in FIG. 9. Referring to FIG. 9, a microscope lamp 97 cooperates with condensing lens 98 and cylindrical lens 98' to focus a bright rectangular light spot onto the rim of flywheel 54. The flywheel rim is painted white and one end 99 of fiberoptics light guide 100 is adapted to receive the diffused reflection. Light guide 100 passes into the detector section of the spectrometer and the termination thereof can be seen in FIG. 8, wherein opposite end 101 of the light guide directs light onto scatter-plate filter mirror 43. Being visible light of short wavelength, this auxiliary beam is diffusely reflected from mirror 43 and a portion of its energy joins the infrared beam of FIG. 8 in the correct optical path to be focused into bolometer detector 45.

Figure 16:
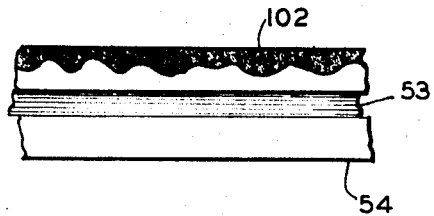
FIG. 16 is a horizontal view along line 16—16 of FIG. 9.

Referring again to FIG. 9, the amount of auxiliary light entering end 99 of light guide 100 at each point in the scan cycle is adjusted by covering with black tape a larger or smaller portion of the corresponding illuminated white surface on the rim of flywheel 54. FIG. 16, which is a horizontal view along line 16—16 of FIG. 9, illustrates a typical portion of the contoured tape, the latter being identified by reference numeral 102. Contoured tape 102 thus forms a reflection mask which moves past the illuminating assembly as flywheel 54 rotates, one revolution accommodating each complete double scan with overshoot and turnaround. Tape 102 can be programmed to produce a base line spectrum appropriate for the particular type of wafer film being measured.

An alternative embodiment of the auxiliary linearization system employs a transmission mask in place of the reflection mask, and is programmed by means of individual screw adjustments, each of which controls the position of one small segment of mask contour.

In certain applications it is desirable to provide one or more additional auxiliary linearization systems, essentially identical to the illustrated embodiment and similarly impinging on filter mirror 43. Each has its own separate light source and each is programmed to compensate for some particular condition which may be present at some times but not at others. For example, it is sometimes desirable to measure epitaxial film thickness of a wafer sealed inside a polyethylene envelope, whereupon the polyethylene selectively absorbs certain infrared wavelengths. A separate auxiliary linearization system, programmed only to compensate for the polyethylene absorption spectrum, can then be applied or removed simply by switching its light source on or off. Furthermore, the compensation energy level can be adjusted for different polyethylene thicknesses by controlling the intensity of the light source.

Reference is now made to the display system 16 on the composite block diagram of FIG. 1. In the preferred embodiment of the present invention the display device is a conventional cathode-ray oscilloscope which functions as a fast response X-Y plotter. The oscilloscope should have a visual presentation with a retention time equal to two or more complete spectrum scans. As hereinbefore mentioned, a voltage signal responsive to wavelength is applied to the oscilloscope as an X-axis deflection, and a voltage signal responsive to detected beam intensity is applied as a Y-axis deflection. As a spectrum is continually and repeatedly scanned, the wavelength transducer system tracks the scanning movement and plots it on the X-axis, approximately linearly in microns. The optical computer system monitors the movement of Littrow arm 40 and places marker lines precisely at the fringe peak positions corresponding to its thickness setting. Both of these systems are fast enough that no perceptible time lag occurs at any scan speed.

In many optical wavelength ranges other than the infrared, fast detection and readout systems are readily available so that the intensity signal to the Y-axis can also operate in real time, and the bidirectional spectra are displayed in phase and precisely superimposed. In the infrared range, however, and particularly in the far infrared, radiant energy can be detected only from thermal effects which involve appreciable response time delays. Because of the scarcity of radiant energy at far infrared wavelengths, some noise-filtering circuitry is necessary in the detection and readout system, and this introduces additional time and phase lags.

The scanning and display method of the present invention, therefore, is especially important and valuable in the infrared spectral region since it provides for precise balancing of all time and phase lags, from whatever source. If the total lag in the detection and readout system is a small fraction of one fringe cycle, it appears on the display as a slight spreading or mismatch of fringe waveforms on the two opposite scan directions. Viewing the superimposition of alternate scans, the operator visually balances the two slightly offset waveforms and positions marker lines at the centers of the "split" composite fringe peaks. In this form, the balancing method of the present invention is applicable to optical spectra other than interference fringe spectra.

In the case of interference fringe spectra, however, wherein similar fringe peak waveforms are repeated at approximately constant time frequency, the scanning and display method of the present invention can also balance and compensate for phase lags which are much larger relative to the fringe width, and thereby attain much greater scanning speeds relative to detector response limitations, as explained hereinafter.

In the preferred embodiment, the total time delay of the detector and readout system is 25 milliseconds on the display screen. For any given wafer, the scanning speed is set so that the interference fringes occur at 50 milliseconds per cycle (20 Hz. frequency) and the phase lag is exactly 180°. On the real time display, therefore, the fringes on the two opposite directions are shifted one-half order each and the spectra again superimpose precisely, but with an apparent peak-to-valley phase inversion. The trace is reinverted electronically on the display.

By this method it is apparent that any combination of fringe frequency and detection time lag which produces a phase lag of ½, 1, 1½, 2, etc. fringe cycles can be balanced out precisely and the opposite direction waveforms superimposed. These conditions need to be satisfied only approximately, since small departures from half-order increments of phase lag are visually balanced in the manner previously described for small total lags.

Although the oscilloscope has produced superior results in the present invention, there are other devices which could be employed for the display pattern. Examples of alternatives are a fast optical galvanometer-type X-Y plotter or a special moving-slit light beam deflection system using photorecording or a light-activated phosphor screen.

Reference is now made to the main power input system 19 on the composite block diagram of FIG. 1. Because this system for the preferred embodiment of this invention is conventional in all respects, the component parts thereof will not be enumerated in detail. Many electrical components cooperating with the main power system can be found in the block diagrams hereinbefore presented.

Referring now to the marker programming system, the preferred embodiment hereinbefore described comprises an optical computer system. The basic function of this system is to produce marker-triggering signals at certain programmed and variable positions of a wavelength-determining member of the spectrometer. This function can be accomplished by a variety of alternative devices and systems such as electrical contacting devices or noncontacting devices based on capacitive or magnetic proximity detection. If the wavelength is precisely transduced into a voltage signal, a voltage divider network may be used, triggered by means of voltage null or crossover detection.

The means and method taught by the present invention have cooperated to provide film thickness measurements at rates heretofore unattainable. For example, prior art thickness measurements obtained from conventional infrared spectrometers and separate interpretation of the fringe pattern generally require at least 1 to 2 minutes per reading. Through the remarkable contributions of the present invention it has become possible to obtain five or more accurate thickness measurements per minute. As many as 15 measurements per minute are attainable using a second operator to observe and write down the thickness values while the first operator handles wafers and adjusts the markers.

Prior art optical interference measuring systems have consistently employed beam chopping with AC detection and amplification, requiring amplitude demodulation or null balancing servosystems to form the interference fringe spectrum. Such AC systems, however, are not amenable to the greatly increased scanning speeds which are necessary for fast readings. Researchers have long sought faster and more automatic means for measurement of epitaxial silicon layer thickness. However, it was concluded that a spectrometer especially designed for this purpose, employing the most advanced technology, would be limited by the response time of room temperature infrared detectors to a maximum scanning speed of 10 to 20 seconds per spectrum.

The remarkable embodiment of the present invention, however, although employing a commercially available room temperature detector, achieves a scanning speed of 0.1 seconds to 2 seconds per spectrum, with film thickness measurement precision and reproducibility superior to that of prior art devices and methods.

Prior to the present invention, direct DC detection and amplification of the infrared spectrum without beam chopping was considered an impractical approach for a fast scan spectrometer. In the present discovery, however, it has become possible to successfully utilize DC detection and this system is particularly advantageous when applied to spectra of a repetitive waveform nature.

In summarizing the present invention, therefore, the following points can be restated. The fringe pattern exists in the light beam reflected from the specimen as a function of intensity versus wavelength. The significant data points are the fringe maxima and minima. Through accurate design and calibration of the infrared optical monochromator system, the wavelength function is translated accurately and permanently into a well-defined function of Littrow mirror angle, which angle is established by Littrow arm position. The wavelength transducer continually senses the Littrow arm position, hence wavelength, and plots it precisely on the X-axis of the display, in real time. The unique optical computer system also senses the Littrow arm positions and triggers marker lines on the display at precise, specific programmed positions, also in real time. The infrared detector locates the intensity peaks and valleys and plots them on the Y-axis of the display, but with a constant time delay. The unique variable-speed bidirectional scanning and display method allows the operator to balance out the time delay and precisely locate the true positions of peaks and valleys on the wavelength scale. A single manual control adjusts the programming of all of the marker lines in concert according to a film thickness function, and synchronously drives a thickness readout device.

Of significance herein is the fact that the display means serves only to present the fringe spectrum and the index marks on a common frame of reference in such a way that they can be matched by means of the optical computer control. The accuracy and linearity of the wavelength scale on the display is not critical so long as it is precisely the same from one scan to the next. The quantitative accuracy and linearity of the vertical intensity scale of the display is not critical. The expansion and position settings on both the X and Y axes of the display are arbitrary, and are merely chosen for comfortable viewing.

The thickness measurement function is permanently and precisely locked into the mechanical and optical structure of the spectrometer and optical computer. The precision of the method of time lag balancing depends only on the lag remaining the same from one scan to the next.

Although not incorporated in the illustrated embodiment of this invention, the scanning speed control function may be operationally coupled with the micrometer mechanism in a programmed manner so that scanning speed is always appropriate for the thickness setting of the optical computer, as controlled by the operator's handwheel.

In using the measuring instrument which was described herein as a preferred embodiment, the following procedure is utilized. The main power input to the instrument is first energized. After a sufficient warmup and stabilization period, the specimen to be measured, for example, a silicon wafer, is placed upon a platform which exposes it to the illumination and reflectance optics. Scanning speed is adjusted to a suitable range whereupon a characteristic spectrometer fringe pattern is displayed on the oscilloscope. Vertical marker lines also appear on the oscilloscope display. The operator then rotates the handwheel of the micrometer mechanism until the marker lines coincide with each of the peaks of the fringe pattern. When the correct alignment is achieved, the film thickness is automatically displayed on the measuring dial. In certain applications where it may be desired to follow gradual variations in film thickness over an extended area of the specimen, the continually repeated oscilloscope display exhibits gradually shifting fringe peak positions as different areas of the specimen film are scanned. Accordingly, the thickness readout handwheel may be adjusted as required to obtain a thickness reading at any given location.

While the present invention has been described with respect to a particular embodiment thereof, it will be understood that numerous modifications may be made by those skilled in the art without departing from the spirit and scope of the appended claims.

The embodiments of this invention in which an exclusive property or privilege is claimed are defined as follows:

1. In an instrument for measuring the thickness of a film by optical interference wherein wavelength scanning is utilized to produce an interference waveform, said instrument having a light source, illumination means cooperating with said light source to direct light against said film, reflectance means adapted to receive reflected light from said film and direct said reflected light to a monochromator for resolution of determined wavelengths within said reflected light, a pivotal Littrow arm and affixed mirror cooperating with said monochromator and adapted to cause a determined wavelength of said reflected light to emerge from said monochromator, scanning drive means adapted to cooperatively pivot said Littrow arm and actuate said monochromator, a beam detector responsive to the intensity of said determined wavelength and adapted to produce a signal proportional to said intensity, wavelength transducer means responsive to the position of said Littrow arm and adapted to produce a signal proportional to said determined wavelength, and display means cooperating with the respective signals from said beam detector and said wavelength transducer to display an interference waveform, the improvement which comprises a marker programming system comprising, in combination, a stationary light source adapted to illuminate one side of an adjustably mounted light discriminator having a plurality of discrete light passages, the size of said passages being proportional to interference fringe peak wavelengths for determined film thicknesses, a light-sensitive element affixed to said Littrow arm and disposed adjacent said discriminator on the side opposite said stationary light source, said element adapted to produce a signal proportional to the light signal received from said discriminator, circuit means adapted to transmit the signal from said element to said display means for superimposition on said interference waveform, and film thickness readout means responsive to the position of said discriminator.

2. An instrument of claim 1 wherein the film thickness readout means comprises a micrometer screw responsive to longitudinal movement of the light discriminator and coupled to a dial calibrated in units of film thickness.

3. An instrument of claim 1 wherein the light-sensitive element is a photodiode.

4. An instrument of claim 1 wherein the light discriminator is a photographic mask plate.

5. An instrument of claim 1 wherein the main optical path contains auxiliary light means.

6. An instrument for measuring the thickness of a film by optical interference wherein wavelength scanning is utilized to produce an interference waveform, said instrument comprising a light source, illumination means cooperating with said light source to direct light against said film, reflectance means adapted to receive reflected light from said film and direct said reflected light to a monochromator for resolution of determined wavelength within said reflected light, a pivotal Littrow arm and affixed mirror cooperating with said monochromator and adapted to cause a determined wavelength of said reflected light to emerge from said monochromator, scanning drive means adapted to cooperatively pivot said Littrow arm and actuate said monochromator, a beam detector responsive to the intensity of said determined wavelength and adapted to produce a signal proportional to said intensity, wavelength transducer means responsive to the position of said Littrow arm and adapted to produce a signal proportional to said determined wavelength, said wavelength transducer means comprising, in combination, a lamp, a condenser lens cooperating with said lamp, a lamp housing adapted to focus light from said lens upon a photodiode, a masked photographic plate affixed to said Littrow arm and disposed between said lens and said photodiode, the masking on said plate adapted to pass light to said photodiode in proportion to said determined wavelength, display means cooperating with the respective signals from said beam detector and said wavelength transducer means to display an interference waveform, and a marker programming system comprising, in combination, a stationary light source adapted to illuminate one side of an adjustably mounted light discriminator having a plurality of discrete light passages, the size of said passages being proportional to interference fringe peak wavelengths for determined film thicknesses, a light-sensitive element affixed to said Littrow arm and disposed adjacent said discriminator on the side opposite said stationary light source, said element adapted to produce a signal proportional to the light signal received from said discriminator, circuit means adapted to transmit the signal from said element to said display means for superimposition on said interference waveform, and film thickness readout means responsive to the position of said discriminator.